Patented Apr. 22, 1952

2,593,492

UNITED STATES PATENT OFFICE 2,593,492

HYDRAULIC CEMENT COMPOSITION AND INDURATING COMPOSITION THEREFOR

Edward W. Scripture, Jr., Cleveland Heights, Ohio, assignor to The Master Builders Company, Cleveland, Ohio, a corporation of Ohio No Drawing. Application November 17, 1948, Serial No. 60,635

9 Claims. (Cl. 106—12)

This invention relates to hydraulic cement compositions such as concrete or mortar, and the like, and to indurating compositions for addition to concrete or mortar mixes. It especially relates to such compositions and mixes containing a plasticizing and air entraining agent which permit substantial improvement in the durability of structures prepared from such compositions.

One of the objectives in the cement industry for many years has been to develop a concrete which would have greater resistance to the destructive effects of freezing and thawing, when exposed to the weather, and especially to the extremely destructive effects on pavements when salts, such as calcium chloride and sodium chloride, are used for de-icing. Calcium chloride, for instance, is frequently mixed with sand and scattered on the highway to melt off ice and snow. Concrete pavements made according to the usual methods and with the usual materials tend to scale and deteriorate very rapidly when so treated. Concrete can be improved somewhat in its resistance to freezing and thawing and in its resistance to scaling when treated with calcium chloride by the use of richer mixes or drier mixes, and by improved methods of placing and finishing, but such means have not provided a solution to the problem. It is an object of this invention to provide a cement composition or an indurating composition for cement mixes comprising ingredients which entrain air in the concerete and which markedly increased the plasticity of the concrete.

It is a further object of this invention to produce a concrete of generally improved properties, and particularly of enhanced resistance to repeated freezing and thawing, to provide means whereby concrete, of improved resistance to freezing and thawing may be produced, and to provide cement and concrete produced therefrom exhibiting increased resistance to successive freezing and thawing in the presence of calcium chloride, common salt, and similar agents.

It is a further object of this invention to provide cement and concrete of improved resistance to freezing and thawing which retain their other desirable properties unimpaired, and to improve cement and concrete in these respects without decreasing strength and structural value.

Other objects and advantages of the invention will become apparent as the description proceeds.

It has been found in recent years that a very marked increase in the resistance of concrete to freezing and thawing and in its resistance to scaling on de-icing with calcium chloride and the like can be produced by the entrainment of air in the concrete mix. This air is entrained in the concrete in the form of small, discrete spheroids, and it is thought that these small, discrete spheroids, being totally enclosed within the cement matrix, do not completely fill with water when the concrete is wet and so provide a cushion to minimize the effects of the disruptive forces of freezing and thawing. Also, the incorporation of this entrained air tends to make the mix more fatty and cohesive so that its tendency toward bleeding is reduced. By reducing the bleeding the formation of laitance on the surface of the concrete, which is one of the causes of scaling, is more or less prevented.

In the practice of air entrainment to improve the resistance of concrete to freezing and thawing and to plasticize the mix, it is desirable to produce an air content in the concrete mix lying approximately between 3% and 6% by volume of the concrete. This is about equivalent to 10% to 21% of air in mortar which does not contain large aggregate. If the air content of the concrete is not as high as 3% by volume, the full benefits of air entrainment are not realized. One the other hand, if the air content of the concrete rises above about 5% or 6% by volume, serious losses in strength are produced without any further appreciable increase in durability.

It has not been difficult to find materials which will entrain air in cement; many materials, particularly surface active agents, will accomplish this function. Most such materials, however, have certain deleterious effects on cement mixes. They will interfere with the setting or hardening of the cement; they will cause the cement to have low and undesirable flexural and compressive strengths; they will entrain entirely too much or too litle air; and generally they will have a plurality of these defects.

It has been the practice heretofore to consider that the adverse effects of these reagents were necessary in order to have the advantages of air entrainment. Air-entraining reagents in use are more or less of a compromise in providing a substantial proportion of the obtainable benefits of air entrainment without too greatly interfering with other desirable properties in the cement.

It is an object of the present invention to provide a method of entraining air in concrete and mortar mixes, wherein one may obtain the equivalent of between 3% and 6% air content (by volume) in a concrete mix, and wherein the concrete and mortar produced has compressive and flexural strengths which are not only not appreciably decreased but are improved over that obtained when air is not entrained in the cement.

It is another object of the present invention to provide a material which may be incorporated in cement mixes to greatly increase resistance to freezing and thawing without reducing the compressive strength of the article produced therefrom.

It is another object of the present invention to provide such a material that is compatible with cement dispersing agents, such as calcium lignin sulphonate.

I have found that a certain class of compounds, namely the mononuclear aryl sulfonates which are surface active in that they lower the surface tension of water, will when used in very small quantities entrain a desired amount of air in concrete and thus greatly increase its resistance to freezing and thawing without reducing compressive strength. I have also found that these materials are not only compatible with cement dispersing agents, but when mixed with these materials, such for example as calcium lignin sulfonate, provide enhanced air entrainment. The other qualities, including flexural and structural strengths, are not only not reduced but are greatly increased.

The mononuclear alkyl aryl sulfonates or alkylphenyl sulfonates, which function as above-described in cement mixes, may be designated by the following general formula,

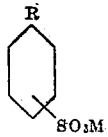

where R is an alkyl radical containing nine or ten to sixteen or eighteen carbon atoms, preferably in the form of a single long chain, and M is a univalent basic radical such as an alkali metal, including sodium, potassium, ammonium and triethanolamine radicals.

The alkylphenyl sulfonate is usually manufactured by a process such that it contains a considerable percentage of sodium sulfate, but in the proportions in which these air entraining agents are used, this sodium sulfate is not injurious to the concrete and it is not necessary to separate the alkylphenyl sulfonate from the sodium sulfate.

I have found that particularly desirable mononuclear alkylaryl sulfonates are sodium and potassium dodecylphenyl sulfonates and mixtures of alkylphenyl sulfonates having an average molecular weight, which indicates that the alkyl groups have an average of about twelve or ten to fourteen carbon atoms. Usual processes of manufacture start with raw materials of mixed molecular weight so that commercially available alkylphenyl sulphonates are mixtures of compounds having different molecular weights.

The alkylphenyl sulfonate may be added to a concrete or mortar mix in the form of a liquid, a paste, or a dry powder, whichever is more convenient and more economical. It will be apparent that the alkylphenyl sulfonate may be added to the cement at any time or ground with the cement at the time of manufacure of the cement. The alkylphenyl sulfonate alone or combined with the other ingredients of the compositions of my invention may be added to the cement, to the aggregate, to the water, or to any other part of the mix prior to mixing or during mixing, or they may be added to the entire mix at any time prior to the completion of the mixing of the cement compositions.

As little as .0005%, based on the weight of the cement, of the mononuclear alkylaryl sulfonate is noticeably effective in increasing the air content of a mortar or concrete mix and improving the properties of the products produced therefrom. An amount of such compound greatly in excess of 0.1% will cause the entrainment of an excessive amount of air. The amount of alkylphenyl sulfonate preferably used is about .001% to .005%, based on the weight of the cement, but with some cements and some concrete mixes it may be desirable to use amounts either above or below these quantities.

When in accordance with the preferred aspect of the present invention the quality of the concrete is further improved by the addition of a cement dispersing agent, such as calcium lignin sulfonate from waste sulfite liquor, I have found that the most desirable proportions of such dispersing agents to be used are from .1% to .2% to about .35% or .5%, by weight of the cement. These quantities of dispersing agent combined with one or more of the aforementioned mononuclear alkylaryl sulfonates substantially improve the quality of the concrete, especially with respect to the compressive and flexural strengths.

It is sometimes desired to increase the rate of hardening of the concrete, and for this purpose an accelerator may be used. Calcium chloride is a readily available and an inexpensive accelerating agent. The desirable proportions of accelerator are usually between .1% to 2% or 2.5%, by weight of the cement. Additional ingredients, such as fly ash and other finely divided materials, may be present in the concrete with the air entraining agent to improve workability or provide pozzuolanic action. If it is desired to increase the ultimate strength of the concrete or mortar, it may be desirable also to incorporate a derivative of benzoic acid, such as set forth in one or more of the United States Patents Nos. 2,264,336, 2,360,517, 2,360,518 and 2,360,519. The preferred derivative of benzoic acid is salicyclic acid or a salt thereof.

It is of interest to note that these alkylphenyl sulfonates, although they give a good but dispersed foam, do not give as good a foam under many conditions as that produced by other surface tension reducing agents, such as the alcohol sulfates, and the foams produced with these alkylphenyl sulfonates do not resist high temperatures but in concrete mixes the foam-forming action of the alkylphenyl sulfonates is enhanced by the alkali of the concrete. Since concrete is mixed and used at normal temperatures, the temperature stability of the foam is of no importance. Hence the alkylphenyl sulphonates are peculiarly adapted for entraining air in concrete mixes.

The increase in the entrained air content and greatly improved resistance to freezing and thawing, accompanied by improvements in strength, securable with alkylphenyl sulfonates, whether used in the form of powder, paste or liquid, will be seen from the following examples.

*Example 1*

Mortar mixes of cement and standard sand were made and tested in accordance with the tentative method of test for air content of air entraining Portland cement mortar (ASTM Designation C185–47T). From this same mortar 2" x 2" cubes were made and tested for compressive strength at the ages of 1, 7 and 28 days. In mix No. 1, which served as the control, no addition was made. In mix No. 2, .0025% alkylphenyl sulfonate was added in the form of a liquid containing 20% of the active ingredient. In mix No. 3, .0025% alkylphenyl sulfonate was added in the form of a paste containing 25% active ingredient, and in mix No. 4, .0024% alkylphenyl sulfonate was added in the form of a dry powder containing 40% active ingredient. All these percentages are based on the weight of the cement. The pertinent data, including the amounts of ingredients added, the percentage of active ingredients added, the percent of entrained air by volume of the mortar, the water-cement ratio by weight, and the compressive strengths at the ages of test, in pounds per sq. in., are shown in the following table:

| Mix No. | 1 | 2 | 3 | 4 |
|---|---|---|---|---|
|  |  | Alkyl Aryl Sulphonate Added | | |
|  |  | 20% Liquid | 25% Paste | 40% Powder |
| Amount added—percent | None | .0125 | .010 | .006 |
| Percent active ingredient | 0 | .0025 | .0025 | .0024 |
| Air entrained—percent | 4.0 | 16.1 | 18.6 | 18.0 |
| Water-Cement ratio by wt | .767 | .600 | .600 | .600 |
| Compressive Strength— p. s. i.: | | | | |
| 1 day | 100 | 250 | 200 | 200 |
| 7 days | 1,125 | 1,525 | 1,540 | 1,400 |
| 28 days | 2,700 | 2,950 | 2,900 | 2,950 |

It will be seen that with no addition the mortar entrains only 4% of air, but with the alkylphenyl sulfonate added, approximately in the proportion of .0025% by weight of the cement, the entrained air content is increased to from 16.1% to 18.6% with the addition of this reagent in the three different forms. The tentative specifications for air entraining Portland cement (ASTM Designation C175–47T) call for an air content of mortar prepared and tested in accordance with Method C185 of 18±3% by volume. It will further be noted that the amount of water required for a given flow, as measured in the ASTM test, is substantially reduced when the alkylphenyl sulfonate is added, and further that at all ages the compressive strengths are substantially increased, although usually with air entraining cements or air entraining agents compressive strengths are decreased.

*Example 2*

To show the effects of the addition of different amounts of alkylphenyl sulfonate used in conjunction with calcium lignosulfonate dispersing agent and calcium chloride, two series of tests were made. In the first series of tests a control mix, No. 1, with no addition was made with 5 sacks of cement per cu. yd. In mix No. 2 the cement dispersing agent and calcium chloride were added in suitable proportions to a concrete mix having approximately 4¼ sacks of cement per cu. yd. In mixes Nos. 3 and 4, with approximately 4¼ sacks of cement per cu. yd., the alkylphenyl sulfonate was added in the proportions of .001% and .002% of the cement by weight, respectively. All the mixes in this series were made to slumps between 4″ and 5″ and the percentages of entrained air were determined by means of the Klein-Walker air meter. In the second series, made at another time, the control mix, No. 5, was again made with 5 sacks of cement per cu. yd. and the three mixes with additions, Nos. 6, 7 and 8 were made with approximately 4¼ sacks of cement per cu. yd. In mix No. 6 the calcium lignosulfonate and calcium chloride were added without air entraining agent. In mixes Nos. 7 and 8 the alkylphenyl sulfonate was added in the proportions of .001% and .002% by weight of the cement, respectively. The air contents were again determined by means of the Klein-Walker air meter. The slumps for this series of mixes were all between 2″ and 3″. The results of both series of mixes are shown in the following tabulation:

| Mix No. | Material Added, percent | | | | Cement Sacks per cu. yd. | Slump, Inches | Air, percent |
|---|---|---|---|---|---|---|---|
|  | Dispersing Agent | Calcium Chloride | Sodium Dodecylphenyl Sulfonate | Water-Cement Ratio, Gals./sack | | | |
| SERIES I | | | | | | | |
| 1 | 0 | 0 | 0 | 6.90 | 5.00 | 4½ | 2.2 |
| 2 | .20 | .70 | 0 | 7.12 | 4.31 | 4¼ | 5.1 |
| 3 | .20 | .70 | .001 | 7.08 | 4.19 | 5 | 7.5 |
| 4 | .20 | .70 | .002 | 6.75 | 4.14 | 5 | 9.9 |
| SERIES II | | | | | | | |
| 5 | 0 | 0 | 0 | 7.08 | 4.96 | 2¾ | 2.1 |
| 6 | .20 | .70 | 0 | 6.84 | 4.34 | 2½ | 4.6 |
| 7 | .20 | .70 | .001 | 6.66 | 4.29 | 2 | 6.3 |
| 8 | .20 | .70 | .002 | 6.47 | 4.25 | 2¼ | 7.8 |

It will be noted that whereas the calcium lignosulfonate dispersing agent entrains more air than is entrained in the control mix, additional air is entrained by the successive additions of increasing amounts of the alkylaryl sulfonate.

*Example 3*

In order to determine the effects of varying quantities of alkylphenyl sulfonate on the properties of concrete, particularly the amount of air entrained and the compressive strength, two series of mixes were made up with varying proportions of alkylphenyl sulfonate combined with calcium lignosulfonate and calcium chloride. All the mixes were made with a nominal cement factor of 6 sacks per cu. yd. and a nominal slump of 3″. Determinations were made of the amount of water required for the same consistency, of the amount of air entrained, and of the compressive strengths at two ages. The specimens from the first series were used to determine the strengths at 28 days, and those from the second series strengths at 1-day. These concrete mixes consisted of cement, sand, and ¾" crushed limestone. They were made in a concrete mixer in a normal manner. Air contents were determined with a Klein-Walker air meter and cylinders for compressive strength were made and broken according to standard methods. In each series the first mix, Nos. 1 and 6, was made without any addition, the second mix, Nos. 2 and 7, with calcium lignosulfonate dispersing agent, and calcium chloride, and the third, fourth and fifth mixes, Nos. 3, 4, and 5 and Nos. 8, 9, and 10, with the same quantities of dispersing agent and calcium chloride but with increasing quantities of alkylphenyl sulfonate. Data secured in these tests are shown in the following table:

*Example 4*

To determine the effect of the entrained air on the resistance of concrete to freezing and thawing, concrete mixes were made up in a mixer and concrete beams for the freezing and thawing tests were made from these mixes in accordance with standard methods. Concrete cylinders were also made from the same mixes for compressive strength determinations. After the cylinders had been cured 28 days they were broken in a compression machine. In the first series of mixes the concrete beams were cured for 28 days and then subjected to alternate freezing and thawing in an apparatus which produced 12 cycles of freezing and thawing per day. The beams from the second series were cured 36 days and then subjected to the alternate cycles of freezing and thawing. The first series of mixes was made with a nominal

| Mix No. | Material Added, Per Cent | | | Slump, Inches | Air, Per Cent | Compressive Strength, Lbs. Sq. In. | |
|---|---|---|---|---|---|---|---|
| | Dispersing Agent | Calcium Chloride | Sodium Dodecyl-phenyl Sulfonate | Water-Cement Ratio, Gals./sack | | | 28 Days | 1 Day |
| 1 | 0 | 0 | 0 | 5.90 | 2¾ | 1.3 | 5,080 | ---------- |
| 2 | .20 | .70 | 0 | 5.11 | 3 | 2.0 | 6,120 | ---------- |
| 3 | .20 | .70 | .001 | 5.11 | 3 | 4.2 | 6,290 | ---------- |
| 4 | .20 | .70 | .002 | 5.07 | 3½ | 4.2 | 5,620 | ---------- |
| 5 | .20 | .70 | .003 | 5.19 | 2¾ | 5.0 | 5,120 | ---------- |

6 SACKS PER CUBIC YARD

| 6 | 0 | 0 | 0 | 9.65 | 4 | 1.3 | ---------- | 1,790 |
| 7 | .20 | .70 | 0 | 8.66 | 3 | 2.2 | ---------- | 2,550 |
| 8 | .20 | .70 | .001 | 8.31 | 3½ | 4.0 | ---------- | 2,170 |
| 9 | .20 | .70 | .002 | 8.89 | 3 | 5.2 | ---------- | 2,120 |
| 10 | .20 | .70 | .003 | 8.75 | 3¼ | 5.9 | ---------- | 1,880 |

It will be seen that the addition of dispersing agent produces small increases in entrained air, but these are greatly increased by the inclusion of alkylphenyl sulfonate in the mix and the amounts of entrained air increase with increasing proportions of alkylphenyl sulfonate. It will be noted also that the amount of water required for a given consistency is greatly decreased when the dispersing agent and alkylphenyl sulfonate are used. Contrary to the general expectation with most air entraining agents, when the air content is greatly increased, compared with the control mix, the strengths of the mixes with considerable proportions of entrained air still show increases in strength, both at 1-day and at 28-days. Even with air contents between 5% and 6% by volume of the concrete, the mixes with dispersing agent and alkylphenyl sulfonate still show strengths higher than those of the corresponding control mixes.

cement factor of 6 sacks per cu. yd. and a nominal slump of 4". The second series of mixes was made with a nominal cement factor of 5 sacks per cu. yd. and a nominal slump of 4". In the first series, mix No. 1 was the control with no addition. Mix No. 2 was made with the addition of dispersing agent and calcium chloride but no alkylphenyl sulfonate. Mixes Nos. 3 and 4 were made with the same addition of alkylphenyl sulfonate as well as dispersing agent and calcium chloride but with a smaller proportion of calcium chloride. In the second series mixes Nos. 5, 6, 7, and 8 correspond to mixes Nos. 1, 2, 3, and 4, respectively, of the first series. The following table shows the additions to each mix, the water-cement ratio required for the same slump, the percent of air entrained, the compressive strength at 28 days, and the number of cycles of freezing and thawing which produced a substantial decrease in the dynamic modulus of elasticity E, as determined by a sonic method of test.

| Mix No. | Material Added, Per Cent | | | | Air, Per Cent | Compressive Strength—28 Days, Lbs. per Sq. In. | No. of Cycles F & T | Per Cent Loss in E |
|---|---|---|---|---|---|---|---|---|
| | Dispersing Agent | Calcium Chloride | Sodium Dodecyl-phenyl Sulphonate | Water-Cement Ratio, Gals./sack | | | | |
| 6 SACKS—SLUMP 4 INCHES | | | | | | | | |
| 1 | 0 | 0 | 0 | 5.91 | 1.1 | 4,360 | 40 | 38 |
| 2 | .25 | .25 | 0 | 5.23 | 2.9 | 5,390 | 150 | 31 |
| 3 | .25 | .25 | .001 | 5.06 | 5.3 | 4,780 | 182 | 25 |
| 4 | .25 | .15 | .001 | 5.00 | 5.2 | 5,330 | 175 | 21 |
| 5 SACKS—SLUMP 4 INCHES | | | | | | | | |
| 5 | 0 | 0 | 0 | 7.50 | 1.4 | 3,980 | 67 | 37 |
| 6 | .25 | .25 | 0 | 6.35 | 3.5 | 4,510 | 186 | 45 |
| 7 | .25 | .25 | .001 | 6.38 | 5.0 | 4,410 | 200 | 24 |
| 8 | .25 | .15 | .001 | 6.25 | 5.1 | 4,540 | 200 | 21 |

It will be noted that in comparison with the plain mix in each series the mixes with cement dispersing agent, with and without alkylphenyl sulfonate, show substantial reductions in the water required for a given consistency. Likewise, in all cases these mixes show substantial increases in strength over the corresponding control mixes. In both series the mixes, Nos. 2 and 6, with cement dispersing agent and calcium chloride only, show some increase in air content over the control mixes with no additions. In mixes Nos. 3 and 4 of series I, and mixes Nos. 7 and 8 of series II, the addition of alkylphenyl sulfonate further increases the entrained air content. All of the mixes with cement dispersing agent and with alkylphenyl sulfonate show substantial increases in their resistance to freezing and thawing, as indicated by the losses in dynamic E and the number of cycles of freezing and thawing required to produce these losses. Whereas the cement dispersing agent and calcium chloride alone give substantial increases in resistance to freezing and thawing, these are greatly enhanced by the addition of the alkylphenyl sulfonate and the entrainment of more air.

The Portland cement utilized in the above examples may be substituted by other hydraulic cements. The quantities of the ingredients may be varied or the aggregates may be omitted entirely in accordance with the usual practices as recognized by those skilled in the art. The sodium dodecylphenyl sulfonate may be substituted by any one or more of the alkali metal (including ammonium and triethanolamine) salts of alkylphenyl sulfonic acids having 9 to 18 carbons in the alkyl group, although as above stated mixtures of sulfonates having an average of 12 carbons in the alkyl group are preferred.

Furthermore, the inclusion of other materials in the concrete or mortar mixes or in the compositions claimed which are known to have beneficial effects on the resultant product, such as finely divided pozzuolanic or inert powders, and derivatives of benzoic acid, such as salicylic acid, may be included in these mixes and compositions or in the cement without departing from my invention.

Furthermore it is to be understood that the particular form of product shown and described and the particular procedure set forth are presented for purposes of explanation and illustration, and that various modifications of said product and procedure can be made without departing from my invention as defined in the appended claims.

What I claim is:

1. A dry hydraulic cement containing .001% to .005%, based on the weight of the cement, of an alkylphenyl sulfonate containing about 9 to 18 carbon atoms in the alkyl group.

2. A dry hydraulic cement containing .001% to .005%, by weight of the cement, of a salt of a univalent base and alkylphenyl sulfonic acids having an average of about 10 to 14 carbon atoms in the alkyl groups.

3. A dry hydraulic cement according to claim 1 which also contains a calcium ligno sulphonate dispersing agent in the proportions of .1% to .5% of the weight of the cement.

4. A dry hydraulic cement in accordance with claim 1 containing calcium lignin sulfonate dried from waste sulfite liquor in the proportions of .1% to .5% of the weight of the cement.

5. An hydraulic cement concrete or mortar mix containing a water-soluble alkylphenyl sulfonate in the amount of .001% to .005%, by weight of the cement, said alkylphenyl sulfonate containing 9 to 18 carbon atoms in the alkyl group.

6. An hydraulic cement concrete or mortar mix according to claim 5 containing a calcium ligno sulphonate dispersing agent in the amount of .1% to .5% of the weight of the cement.

7. The mix according to claim 6 in which the cement dispersing agent is calcium lignin sulfonate.

8. An indurating composition for hydraulic cement mixes comprising in combination an alkylphenyl sulfonate and a calcium ligno sulphonate dispersing agent, said ingredients being proportioned to provide when added to cement .1% to .5%, based on the weight of the cement, of said cement dispersing agent, and at the same time .001% to .005%, by weight of the cement, of said alkylphenyl sulfonate, said alkylphenyl sulfonate being a monovalent base salt of an alkylphenyl sulfonic acid having 9 to 18 carbon atoms in the alkyl group.

9. The indurating composition of claim 8 in which the cement dispersing agent is calcium lignin sulfonate, and in which there is present a plurality of alkylphenyl sulfonates having an average of about 12 carbon atoms in the alkyl group.

EDWARD W. SCRIPTURE, Jr.

REFERENCES CITED

The following references are of record in the file of this patent:

UNITED STATES PATENTS

| Number | Name | Date |
| --- | --- | --- |
| 2,004,545 | Wolf et al. | June 11, 1935 |
| 2,188,767 | Cannon et al. | Jan. 30, 1941 |
| 2,240,622 | Lawson | May 6, 1941 |
| 2,360,519 | Scripture | Oct. 17, 1944 |